United States Patent [19]

Nalepa et al.

[11] Patent Number: 4,595,742

[45] Date of Patent: Jun. 17, 1986

[54] DI(ALKYLTHIO)DIAMINE CHAIN EXTENDERS FOR POLYURETHANE ELASTOMERS

[75] Inventors: Christopher J. Nalepa; Paul F. Ranken; Karl E. Wiegand, all of Baton Rouge, La.

[73] Assignee: Ethyl Corporation, Richmond, Va.

[21] Appl. No.: 708,028

[22] Filed: Mar. 4, 1985

[51] Int. Cl.$^4$ .......................... C08G 18/32; B29B 7/00
[52] U.S. Cl. .................................... 528/64; 264/328.1
[58] Field of Search .......................................... 528/64

[56] References Cited

U.S. PATENT DOCUMENTS 4,146,688 3/1979 Schwindt et al. ...................... 528/64

FOREIGN PATENT DOCUMENTS 45-9195 4/1970 Japan .

Primary Examiner—Herbert S. Cockeram
Attorney, Agent, or Firm—Donald L. Johnson; John F. Sieberth; John F. Hunt

[57] ABSTRACT

Polyurethanes and a process for their preparation with aromatic diamines having an aromatic ring, one of said at least one aromatic ring having thereon at least two alkylthio substituents and at least one amino substituent. An isocyanate prepolymer may be combined with a diamine chain extender of the invention and cured at suitable processing temperatures to form elastomers with good physical properties.

30 Claims, No Drawings

DI(ALKYLTHIO)DIAMINE CHAIN EXTENDERS FOR POLYURETHANE ELASTOMERS

This invention relates to polyurethanes in general and to polyurethane chain extenders in particular.

Polyurethane polymers may be prepared by any of various methods using diols, diamines, or other chain extenders in various polyurethane processes. The cast elastomer process is widely used for the preparation of molded articles. Cast elastomers are produced by conducting the necessary chemical reactions in a mold. Polyurethane cast elastomers are used in tires, grain chute liners, conveyor belts, and in many other uses. It is known to use amines such as 4,4'-methylenebis(2-chloroaniline) (MOCA) as a chain extender in the cast elastomer processes; see for example, U.S. Pat. No. 3,752,790. Presently, the use of MOCA as a chain extender is not favored because of its toxicological properties. Nevertheless the use of MOCA provides a polyurethane of suitable physical properties and a replacement with roughly equivalent reactivity and physical properties is sought. It would also be desirable to obtain a polyurethane chain extender which, when used in a cast elastomer process, permits operation at a temperature suitable for maintaining the proper viscosity of the prepolymer while still permitting a pot life of suitable length for proper handling.

We have found that use of the polyurethane chain extenders of the invention is well suited for such preparation of polyurethanes.

SUMMARY OF THE INVENTION

The present invention relates to polyurethane resins prepared from aromatic diamines of such a structure that they contain at least one aromatic ring and at least two alkylthio substituents on this aromatic ring which also contains at least one amino substituent. Therefore, the present invention is a polyurethane product formed by reacting a polyisocyanate, an organic active hydrogen group-containing compound, and a chain extender comprising an aromatic diamine having an aromatic ring, said aromatic ring having thereon at least two alkylthio substituents and at least one amino substituent.

The present invention is also a process for preparing polyurethane cast elastomers comprising the steps of
(A) casting into a mold a reaction mixture of an isocyanate prepolymer and a chain extender comprising an aromatic diamine having an aromatic ring, said aromatic ring having thereon at least two alkylthio substituents and at least one amino substituent;
(B) curing said reaction mixture in said mold to form a polyurethane product; and
(C) subsequently removing said polyurethane product from said mold.

According to this delineation of the invention, a separate portion of a polyol or other active hydrogen group-containing compound may also be used as part of the reaction mixture, especially to decrease viscosity such as where a mixture of diisocyanate isomers is used as in U.S. Pat. No. 4,294,934. Quasi-prepolymer based systems are also within the scope of the invention.

The present invention is also a polyurethane prepared by reacting:
(A) one equivalent part of a prepolymer containing 0.5 to 15.0 percent by weight free —NCO groups prepared by reacting an organic polyisocyanate with an organic active hydrogen group-containing compound with
(B) 0.8 to 1.2 equivalent parts of a chain extender having as its main component an aromatic diamine having an aromatic ring, said aromatic ring having thereon at least two alkylthio substituents and at least one amino substituent.

It has surprisingly been found that aromatic diamines having a structure wherein at least two alkylthio substituents are on the same aromatic ring as at least one amino substituent provide excellent polyurethane products of good physical properties by a process which permits a sufficient pot life at conventional operating temperatures. The pot lives of polyurethane resins cast with the aromatic diamines of the present invention are of sufficient duration to permit normal handling and auxiliary procedures to be performed while maintaining the prepolymer at a suitable viscosity level under normal operating temperatures. Thus, the processing conditions for the polyurethanes of the invention are advantageous and provide elastomers of good quality.

DESCRIPTION OF THE PREFERRED EMBODIMENTS

The aromatic diamines of the present invention may be used for the preparation of polyurethanes by any of various methods including reaction injection molding (RIM), cast elastomer processes, foam elastomer processes, spray processes, and other processes known in the polyurethane arts. The diamines of the invention are especially suited for various casting processes because they permit advantageous pot lives at suitable operating temperatures.

Polyurethanes may be formed by reacting the components of a system over a broad range of temperatures, generally room temperature (30° C.) to 150° C., preferably 35° C. to 110° C.

According to the cast elastomer process of the invention, the reaction components are reacted in a casting process employing favorably long casting times. The mixture is optionally and preferably subjected to vacuum to prevent holes in the cast molded product. The polyisocyanate and organic active hydrogen group-containing compound, often a polyol, are first pre-reacted and then cured with a chain extender. The cast elastomer process is ordinarily carried out at about 25°–150° C. and the reaction times are characteristically about 5–15 minutes.

The elastomers are made by pouring a reaction mixture into a mold where they are allowed to cure. Production can be carried out by a one-shot or a prepolymer method; the latter being presently preferred. In that method, an organic active hydrogen group-containing compound, often a polyol, of about 400 to 5,000 molecular weight and of the polyester or polyether type, is reacted with a stoichiometric excess of diisocyanate to produce a prepolymer. Chain extension is then carried out with a chain extender of the type described herein. In the one-shot method an isocyanate stream is mixed with a stream containing the other components, usually including a catalyst such as dibutyl tin dilaurate.

Factors influencing the final properties are molecular structure, chain entanglement, and secondary binding forces such as the hydrogen bonding and Van der Waals forces. These are controlled by selection of the molecular components employed, as well known in the art. For example, typically each backbone exhibits its own advantages and disadvantages; e.g. polyether types display better resilience, lower heat buildup, better hydrolytic stability, good low temperature properties, and low processing viscosity. The polyesters, however, are tough, abrasion-resistant elastomers with better oil resistance and can be produced at lower costs. It should be noted that these comparisons are made with urethanes having the same hardness.

A common technique for producing high quality castings is by the use of an automatic dispensing machine. The machine degasses the prepolymer either in a batch or continuous mode and meters it along with the chain extender in controlled proportions to a mix head. Here the components are mixed thoroughly, then discharged into a mold. A significant advantage in liquid casting is that less capital expense is required for processing equipment as compared to that needed for the thermoplastic or millable gum elastomers.

Urethane cast elastomers of the type known in the art have a hardness range of approximately 10 Shore A to 80 Shore D. These polymers are tough, abrasion-resistant, with good mechanical strength and oxidation resistance. They are used in truck tires, grain chute liners, conveyor belts, gears, seals, and in many industrial parts.

The aromatic chain extenders of the present invention used for the cast elastomer process may be mononuclear, dinuclear, or polynuclear. In addition to the active hydrogen group-containing compound, the isocyanate, and the chain extender of the invention, the elastomer compositions of the invention may also include other materials commonly employed in making polyurethane products. These including blowing agents such as water, and volatile organic substances such as freons like monofluorotrichloromethane, chlorodifluoromethane and the like. The cast elastomer polyurethane may also contain additional components such as a flame retardant, an emulsifier, a reaction decelerator, a dye, cell regulator, bacteriostatic agent, mold release agent, or the like. Foam stabilizers and fillers may also be included.

A catalyst may comprise from about 0.00001 to 10 weight percent, preferably from about 0.001 to about 1.0 weight percent of the total reaction mixture. Tin compounds are typically used as catalysts.

According to the cast elastomer process of the invention, a reaction product comprising free-isocyanate groups is prepared by reacting an organic active hydrogen group-containing compound with a stoichiometric excess of a polyisocyanate component. In some instances, a large excess can be added to the reaction zone and subsequently some of the excess removed by distillation or flash under reduced pressure. The prepolymer contains free —NCO groups in an amount over the range of 0.1 to about 20 percent by weight, preferably 0.5 to 15.0 percent by weight, more preferably 2.0 to 7.0 percent by weight. The initial process step yields a prepolymer which has not yet been extended by the chain extenders provided by this invention. The amount of polyisocyanate used is generally from about 1.1 to 2 or more equivalents per equivalent of organic active hydrogen group-containing compound. This prepares a prepolymer which can then be reacted with the chain extender comprising an aromatic diamine of the invention which acts as a "curing agent" in this cast elastomer embodiment.

It may be desirable to admix the curing agent and the prepolymer after the prepolymer has been heated to a temperature to reduce the viscosity of the prepolymer. This temperature is above 25° C., usually above 50° C., more usually above about 70° C. However, the temperature should not be so high as to exceed the point at which the prepolymer or any material admixed therewith undergoes an undesirable amount of thermal decomposition. This is generally avoided by keeping the temperature below 150° C. usually about 100° C. or lower. By way of general example, a cast elastomer may be produced according to the invention from a prepolymer first prepared by reacting tolylene diisocyanate (80 weight percent 2,4- and 20 weight percent 2,6- isomers) with a polyester of adipic acid and ethylene glycol such that the isocyanate number is 1.1. This prepolymer is then stirred with a sufficient quantity of one of the chain extenders of the invention such that the isocyanate number is reduced to about 1.0. The resultant mixture is poured into a mold that has been preheated to 110° C. The resultant product is removed from the mold after at least about 5 minutes or more, typically after 1 hour or more.

The polyisocyanate components of the invention may be selected from organic isocyanates including aliphatic, cycloaliphatic, araliphatic, aromatic, and heterocyclic polyisocyanates among others. Examples include ethylene diisocyanate, tetramethylene-1,4-diisocyanate; hexamethylene-1,6-diisocyanate, dodecane-1,12-diisocyanate; cyclobutane-1,3-diisocyanate; cyclohexane-1,3-diisocyanate and cyclohexane-1,4-diisocyanate (and mixtures of these isomers); 1-isocyanato-3,3,5-trimethyl-5-isocyanatomethyl-cyclohexane; hexahydrotolylene-2,4-diisocyanate; hexahydrotolylene-2,6-diisocyanate (and mixtures of these isomers); hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate; phenylene-1,3-diisocyanate; phenylene-1,4-diisocyanate; tolylene-2,4-diisocyanate and tolylene-2,6-diisocyanate (and mixtures of these isomers); diphenylmethane-2,4'-diisocyanate; diphenylmethane-4,4'-diisocyanate; naphthylene-1,5-diisocyanate; triphenylmethane-4,4',-4''-triisocyanate; polyphenylpolymethylene polyisocyanates; meta and para isocyanatophenylsulfonylisocyanates; perchlorinated aryl polyisocyanates; polyisocyanates having carbodiimide groups; polyisocyanates containing allophanate groups; polyisocyanates containing isocyanurate groups; polyisocyanates containing urethane groups; polyisocyanates containing acylated urea groups; polyisocyanates containing biuret groups; polyisocyanates prepared by telomerization reactions; polyisocyanates having ester groups; reaction products of the above-mentioned isocyanates with acetals; polyisocyanates containing polymeric fatty acid groups; 1,3,5-benzenetriisocyanate; polyarylpolyalkylenepolyisocyanates such as polymethylenepolyphenylisocyanate; isocyanates prepared by the phosgenation of the reaction product between aniline and formaldehyde having a functionality of about 2.2 to about 3.5; and others.

As a general rule, it is preferred to use readily available polyisocyanates such as tolylene-2,4-diisocyanate and tolylene-2,6-diisocyanate and mixtures of these isomers (TDI); polyphenylpolymethylenepolyisocyanates; and polyisocyanates containing carbodiimide groups, urethane groups, allophanate groups, isocyanurate groups, urea groups, or biuret groups or mixtures of any of the above.

The component of the polyurethane reaction mixture described herein as an organic active hydrogen group-containing compound is typically a polyether diol or a polyester diol. However the organic active hydrogen group-containing compound may be an amine terminated polyether or a similar component suitable for reaction with the polyisocyanate component to form a prepolymer in the cast elastomer embodiment of the invention. Typically, the polyols contain about 90 percent of the hydroxyl groups present as primary hydroxyls.

The polyether polyols useful for the invention are made by polymerization of cyclic ethers such as ethylene oxide, propylene oxide, butylene oxide, tetrahydrofuran, and the like. These cyclic ethers can be used individually or as mixtures or in successive fashion when making a polyether. For example, when it is desired to prepare a polyether polyol with a predominance of hydroxyl groups bonded to primary carbon atoms, it is known that such materials can be made by initially polymerizing propylene oxide and/or a higher oxide and then reacting the intermediate thereby produced with ethylene oxide. The organic compounds typically have at least two primary hydroxyl groups (or amine terminal groups) and a molecular weight of from about 400 to about 12,000, more preferably from about 400 to about 7,000 or 5,000. Typically, the polyethers are made by polymerization of ethylene oxide alone or as a mixture with propylene oxide, butylene oxide, THF, or the like or in succession addition. Polythioethers, polyacetals, polycarbonates, polyester amides and polyamides, and other polyhydroxyl compounds may also be used.

The amine terminated polyether resins are useful for the invention of polyether resins made from an appropriate initiator to which lower alkylene oxide such as ethylene oxide, propylene oxide, butylene oxide, or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of the hydroxyl groups are replaced by amine groups. Therefore the amine terminated polyether resins useful in this invention generally have greater than 50% of the active hydrogens in the form of amine hydrogens. If ethylene oxide is used it is desirable to react the hydroxyl terminated polyol with a small amount of higher alkylene oxide to ensure that the terminal hydroxyl groups are essentially all secondary hydroxyl groups. The polyols are thereafter reductively aminated.

Suitable polyesters containing hydroxyl groups include, e.g. reaction products of polyhydric (preferably dihydric) alcohols, optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may, of course, be used for preparing the polyesters. The polycarboxylic acids may be aliphatic, cycloaliphatic, aromatic, and/or heterocyclic and they may be substituted, e.g. by halogen atoms, and/or may be unsaturated. Exemplary compounds include succinic acid, adipic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, glutaric acid anhydride, maleic acid, maleic acid anhydride, dimeric and trimeric fatty acids such as oleic acid. Exemplary polyhydric alcohols include ethylene glycol, propylene glycol, butylene glycol, hexanediol, octanediol, neopentyl glycol, cyclohexane dimethanol, 2-methyl-1,3-propanediol, glycerol, trimethylolpropane, hexanetriol, butanetriol, trimethylolethane, pentaerythritol, mannitol, sorbitol, methyl glycoside, diethylene glycol, triethylene glycol, dipropylene glycol, polypropylene glycol, dibutylene glycol, polybutylene glycols, and the like. The polyesters may also contain a proportion of carboxyl end groups. Polyesters of lactones may also be used. The polyesters have at least 2 and generally from 2 to 8, preferably 2 or 3, hydroxyl groups.

The organic active hydrogen group-containing compounds thus include polyethers, polyhydroxy polyols, amine terminated polyethers, and other compounds. They are sometimes referred to as having isocyanate reactive hydrogens or Zerewitinoff active hydrogens. Of course, such a description may also refer to the hydrogens of the chain extenders.

Release agents generally known in the art as "external mold release agents", such as silicon oils, are frequently used when carrying out a cast elastomer process and also for certain RIM processes. Various "internal mold release agents" may also be used.

The quantities of reactants used to make a polyurethane according to the invention is such that the number of —NCO functions is substantially the same as the combined amino groups of the chain extender and active hydrogen groups of the active hydrogen group-containing compound. That is, the quantities of reactants used in the process according to the present invention are generally adjusted so that the molar ratio of polyisocyanates to combined active hydrogen group-containing compound and chain extender is from about 0.8 to about 1.2, sometimes larger depending on the particular procedure employed. Typically, with prepolymers in a cast elastomer process, the isocyanate content of the prepolymer is from about 1 to 10 percent, by weight, preferably 2 to 7 percent by weight. With non-prepolymer formulations, the isocyanate content by weight is much higher, e.g. 19 weight percent or more. The combined active hydrogen groups and amino groups (from the diamine extender) must accordingly comprise a total molar amount equivalent to the isocyanate functions.

Thus for cast elastomer prepolymer formulation systems a portion of diamine is chosen so that the ratio of free —NCO groups to $NH_2$ groups is from 1:0.8 to 1:1.2, preferably 1:0.95 to 1:1.05. That is, about one equivalent part of prepolymer is reacted with about a stoichiometric equivalent part of diamine.

The molar ratio of reactive hydrogens in the chain lengthening agent, to reactive groups in the organic active hydrogen group-containing compound may vary within wide limits but is preferably within the range of about 0.4 to 1.5 such that the polyurethanes obtained range from soft to rigid polymers. The chain extender generally comprises from 2–50 weight percent, preferably 5–30 weight percent of the reaction mixture for the elastomer.

Elastic and semi-elastic foams are obtainable by using the polyurethane components of the present invention and such foams may be used in upholstery, padding materials, mattresses, and the like.

The chain extenders of the invention comprise and preferably predominantly contain aromatic diamines having at least two alkylthio substituents and at least one amino substituent on the same aromatic ring of the diamine. Alkylthio groups contain an alkyl group bound to the aromatic nucleus through a sulfur group. The alkyl group may contain 1 to 50 carbon atoms of linear, cyclic, or branched structure, preferably 1 to 20 carbon atoms, more preferably 1 to 6 carbon atoms. The aromatic diamines may have one, two, or more aromatic rings so long as a total of at least two amino groups are present as substituents on the aromatic rings and so long as one aromatic ring has at least two alkylthio substituents and at least one amino substituent.

A few representative examples of the diamines of the invention are 3,5-di(ethylthio)-2,4-diaminotoluene;
4,4'-ethylidenebis[2,6-di(methylthio)aniline];
4,4'-methylenebis[2,6-di(ethylthio)aniline];
1,4-diamino-2,3-di(methylthio)naphthalene;
2,6-di(methylthio)-4-aminomethylaniline;
4,4'-[2,6-di(ethylthio)aminophenyl][2-ethyl-6-(methylthio)aminophenyl]methane;
3-(methylthio)-5-(ethylthio)-2,4-diaminochlorobenzene;
6-nitro-3,5-di(methylthio)-2,4-diaminotoluene;
6-carbomethoxy-3,5-di(propylthio)-2,4-diamino-ethylbenzene;
3,5-di(methylthio)-2,4-diamino-ethoxybenzene;
2,2'-methylenebis [4,6-di(methylthio)aniline];
3,3',5-tri(methylthio)-4,4'-diamino-diphenylmethane;
4,4'-diamino-3,3',5,5'-tetra(methylthio) biphenyl;
3,5-di(methylthio)-2,4-diaminotoluene;
3-(methylthio)-5-(ethylthio)-2,4-diaminotoluene.

Thus, the aromatic diamines of the invention include the preferred group of single ring compounds having the following structure:

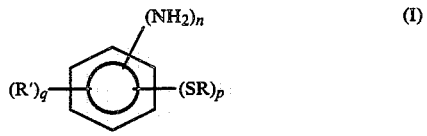

(I)

wherein the R are the same or different alkyl, preferably $C_1$ to $C_{20}$ alkyl, more preferably $C_1$ to $C_6$ alkyl; the R' are the same or different and are selected from H or any other substituent which doesn't adversely affect polyurethane formation, preferably alkyl, aryl, alkaryl, aralkyl, alkenyl or other inorganic substituent such as halogen, nitro, alkoxy, carboalkoxy, etc., more preferably H or $C_1$ to $C_6$ alkyl; n is 2 or 3, preferably 2; p is 2 or 3, preferably 2; and q is 0 to 2.

This class of extenders of the invention includes the substituted (preferably alkyl substituted) and unsubstituted di(alkylthio)diaminobenzenes, preferably di(methylthio)diaminobenzenes.

Also included in the invention is the preferred group of dinuclear aromatic diamines. Among these are the 4,4'-alkylenebis(aminophenyl) compounds of structure II.

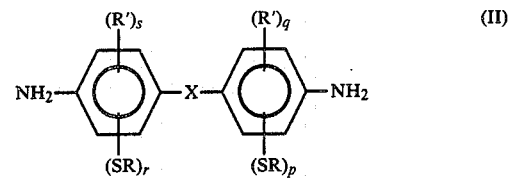

(II)

wherein R, R', p, and q are as defined above, s is 0 to 4; r is 0 to 4; and X is alkylene or alkylidene such as methylene, ethylidene, propylene, isopropylidene, and the like, preferably methylene. Thus the alkylenebis(aminobenzenes) with two alkylthio substituents on at least one aminobenzene ring are a preferred class of compounds for the invention.

Thus the bis(aminophenyl) aromatic diamines of the invention have two alkylthio groups on the same aromatic ring as one amino substituent and optionally one or two alkylthio substituents on the ring having the second amino substituent.

The above formulations are only exemplary of the aromatic diamines of the invention. Of course the 2,2'-bis(aminophenyl) and 2,4'-bis(aminophenyl) compounds are also included. Likewise, the bridge X could be a single bond, —O—, —S—, —SO$_2$—,

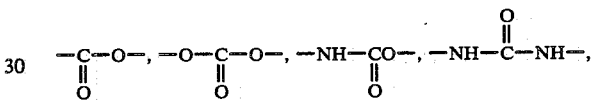

or other suitable linking groups.

Similarly, various polynuclear compounds are included in the aromatic diamines of the invention so long as at least one amino substituent and at least two alkylthio substituents are present on one ring of the diamine.

It is highly preferred that at least one of the alkylthio groups be positioned ortho to one of the amino substituents in the aromatic diamines of the invention.

For cast elastomer processes, it is generally preferred to use a diamine of the invention with precisely two alkylthio substituents and at least one amino substituent on one aromatic ring of the diamine. In fact, it is more preferred to use a diamine with precisely two alkylthio substituents and two amino substituents on one ring of the diamine.

The aromatic diamines of the invention may be included with other known chain extenders for production of polyurethanes according to the invention. However, it is preferred that the aromatic diamines of the invention be the predominant, that is greater than 50%, component of the chain extender for polyurethane formulations of the invention since they provide very good pot lives for cast elastomers and excellent physical properties for resultant polyurethanes. It is more preferred to use the diamine extenders of the invention as essentially the only diamines in the polyurethane formulation, especially since they provide excellent pot lives at normal operating temperatures. One exception to this preference sometimes occurs when the diamine has three alkylthio substituents on the same ring as one or two amino substituents . The tri(alkylthiolated) rings are especially useful with high NCO content prepolymers. The trisubstituted diamines give a pot life about twice as long as the comparable MOCA formulation.

The alkyl substituents of the alkylthio groups include both acyclic and cyclic entities. Thus methyl, ethyl, isopropyl, sec-butyl, tert-butyl, pentyl, n-hexyl, cyclopentyl, cyclohexyl, dodecyl, eicosyl, and many other alkyls (cycloalkyls).

Mixtures of chain extenders are useable according to the invention. It is possible to use diamine mixtures having a portion of monoalkylthio diamine along with dialkylthio and trialkylthio diamines.

Exemplary compounds of the aromatic diamines of the invention include the following:
2,4-di(methylthio)-meta-phenylenediamine;
4,6-di(methylthio)-meta-phenylenediamine;
2,4-di(ethylthio)-meta-phenylenediamine;
4,6-di(ethylthio)-meta-phenylenediamine;
2,4-di(n-butylthio)-meta-phenylenediamine;
2,5-di(methylthio)-meta-phenylenediamine;
2-(methylthio)-4-(ethylthio)-meta-phenylenediamine;
3,5-di(methylthio)-2,4-diaminotoluene;
3,5-di(ethylthio)-2,4-diaminotoluene;
3,5-di(methylthio)-2,6-diaminotoluene;
3,5-di(propylthio)-2,6-diaminotoluene;
3-(methylthio)-5-(ethylthio)-2,4-diaminotoluene;
3,5-di(methylthio)-2,4-diamino-ethylbenzene;
3,5-di(ethylthio)-2,6-diamino-ethylbenzene;
3,5-di(cyclohexylthio)-2,4-diaminotoluene;
3-(methylthio)-5-(propylthio)-2,6-diamino-ethylbenzene;
3,5-di(methylthio)-2,4-diamino-chlorobenzene;
3,6-di(ethylthio)-2,4-diamino-chlorobenzene;
4,4'-methylenebis[2,6-di(methylthio)aniline];
[3,5-di(methylthio)-4-aminophenyl][3-(methylthio)-4-aminophenyl]methane;
4,4'-ethylidenebis[2,6-di(ethylthio)aniline];
4,4'-isopropylidenebis[2,6-di(methylthio)aniline];
[3,5-di(methylthio)-4-aminophenyl][3,5-di(ethylthio)-4-aminophenyl]sulfide;
phenyl[3,5-di(methylthio)-2,4-diaminophenyl]methane;
2,6-diamino-3,5-di(n-butylthio)-4-bromotoluene;
[3,5-di(methylthio)-4-aminophenyl][3,5-di(ethylthio)-4-aminophenyl]ether.

A better understanding of the invention may be had by a review of the following examples of the preferred embodiments of the invention.

EXAMPLE 1

Preparation of 3,5-Di(Methylthio)-2,4-Diaminotoluene

A 500 mL 3-neck flask was fitted with a reflux condenser, nitrogen inlet, and dropping funnel. The flask was connected to a trap system comprising an empty 250 mL flask connected to a 500 mL flask containing methanolic KOH (80 grams in 320 mL) followed by an additional empty 250 mL flask and another 500 mL flask containing methanolic KOH (80 g in 320 mL). The reaction vessel was charged with 122 grams (1 mole) of 2,4-toluenediamine and 9.3 grams (0.07 mole) of aluminum chloride in a dry box. The mixture was heated to about 150° C. for 30 minutes and cooled to approximately 100° C. Thereafter about 235 grams (2.5 mole) of methyl disulfide was added rapidly and the mixture was brought to reflux at an initial reflux temperature of 116° C. A thermostatic limit was set at about 160° C. and the reaction was allowed to proceed. After 46 hours, the reaction was complete and vapor phase chromatography analysis of a worked up aliquot indicated the following composition in area percent:

| | |
|---|---|
| 3-(methylthio)-2,4-diaminotoluene | 2.1 percent |
| 5-(methylthio)-2,4-diaminotoluene | 1.7 percent |
| 3,5-di(methylthio)-2,4-diaminotoluene | 87.7 percent |
| 2,4,6-tri(methylthio)-m-phenylenediamine | 7.5 percent |

The work-up of the crude reaction mixture consisted of dilution with 400 mL methylene chloride followed by a treatment with 200 mL 1N NaOH. The organic layer was separated and washed with 200 mL brine. The aqueous layers were extracted with 100 mL methylene chloride. The combined organic layers were dried with Na$_2$SO$_4$. After filtration, the volatile organics were removed by distillation at atmospheric pressure. The residue was distilled under reduced pressure through an 8" Vigreaux column. A small amount of forerun (25.5 g) was collected prior to distillation of the main product fraction at 145°–150° C. and 0.3 mm mercury (130.3 g). The yield was 60.9 percent based on 2,4-toluenediamine and the product was an amber oil consisting of:

| | |
|---|---|
| 3,5-di(methylthio)-2,4-diaminotoluene | 89.4 percent |
| mono(methylthio)-2,4-diaminotoluenes | 7.6 percent |
| tri(methylthio)-m-phenylenediamine | 2.9 percent. |

This formulation was used to determine processing times reflected in Table 1 below.

EXAMPLE 2

Preparation of 5-(Methylthio)-2,4-Diaminotoluene

This example demonstrates preparation of a chain extender having the inventive aromatic diamine as a minor proportion. The reaction time was shorter. A sample was prepared using a single equivalent of methyl disulfide (95.4 g) under similar reaction conditions and the reaction was completed in 16 hours. The product was predominantly mono(methylthio)-2,4-diaminotoluene containing a minority portion of di(methylthio)-2,4-diaminotoluene. A distilled fraction (b.p. 156–161 @ 1.0 mm) had the following analysis:

| | |
|---|---|
| 5-(methylthio)-2,4-diaminotoluene | 79.2% |
| 3-(methylthio)-2,4-diaminotoluene | 3.1% |
| 3,5-di(methylthio)-2,4-diaminotoluene | 17.4% |

EXAMPLE 3

Preparation of 2,4,6-Tri(Methylthio)-Meta-Phenylenediamine

Following the same procedure and using the same apparatus described in Example 1 and using meta-phenylenediamine as a starting material, about 85 grams of the 2,4,6-tri(methylthio)-meta-phenylenediamine extender of the invention were prepared. The compound is a white solid with a melting point of 114°–116° C.

EXAMPLE 4

Preparation of Di(Methylthio)-Diaminotoluene from Commercial Grade Toluenediamine Using the same procedure and apparatus as in Example 1, a 150 gram portion of an isomeric mixture of products was prepared from a commercial grade diaminotoluene. The commercial grade diaminotoluene contained about 80 percent 2,4-diaminotoluene and 20 percent 2,6-diaminotoluene. The resulting product contained about 4.7 area percent mono(methylthio)-diaminotoluene and about 4.1 area percent tri(methylthio)-meta-phenylenediamine, the balance being the isomers 3,5-di(methylthio)-2,6-diaminotoluene at 22.5 area percent and 3,5-di(methylthio)-2,4-diaminotoluene at 67.0 area percent.

EXAMPLE 5

Preparation of Di(Methylthio)-Diaminotoluene

The apparatus and process of Example of 1 was used except (1) the 2.5 equivalents of methyl disulfide were added in four stages and (2) hot (80° C.) toluene was used as the work-up solvent rather than methylene chloride and the crude product was purified by simple short-path distillation. As a result of these changes, the reaction time was reduced from 46 to 23 hours, the work-up was simplified (less tars and better phase separation), and the distilled yield of the reaction was slightly increased to 75.8 percent (vs. 72.8 percent). Purity of the di(methylthio)-2,4-diaminotoluene was 87.8 area percent by vapor phase chromatography.

EXAMPLE 6

Preparation of Di(Methylthio) and Tri(Methylthio)-Meta-Phenylenediamine

Using the apparatus described above and following the same general procedure by refluxing meta-phenylenediamine and methyl disulfide for a period of 125.5 hours, a product was obtained which analyzed by gas chromatography area percent as 8.3 percent mono(methylthio)-meta-phenylenediamines, 43.5 percent di(methylthio)-meta-phenylenediamines and 44.38 percent tri(methylthio)-meta-phenylenediamine.

EXAMPLE 7

Preparation of Di(Ethylthio)-2,4-Diaminotoluene

Di(ethylthio)-2,4-diaminotoluene was synthesized by stirring at reflux a mixture of 500 g (4.4 moles), ethyl disulfide and 610 g (5 moles) of 2,4-diaminotoluene in the presence of 70 g (0.5 moles), $AlCl_3$. Additional ethyl disulfide (685 g; 5.7 moles) was added at such a rate to keep the reaction temperature at 165°–173° C. The reaction was monitored by gas chromatography and the reaction terminated when about 75% of the 2,4-diaminotoluene had been reacted. This took 8–9 hours. Work-up gave a mixture containing about 110 grams 2,4-diaminotoluene; 440 grams mono(ethylthio)-2,4-diaminotoluenes; and 315 grams 3,5-di-(ethylthio)2,4-diaminotoluene. Di(ethylthio)-2,4-diaminotoluene can be purified by $H_3PO_4$ extraction to obtain a liquid (light oil).

A preferred prepolymer composition for use with the invention is a 2,4-toluene diisocyanate (2,4-TDI) based prepolymer which is considered a standard industry prepolymer. A suitable commercially available 2,4-TDI prepolymer is Adiprene ® L-100 2,4-toluene diisocyanate prepolymer. This prepolymer has 4.32 percent free —NCO content. Also available for use with the invention is the Adiprene ® LW-520 prepolymer isocyanate which is based on Desmodur ® W hydrogenated methylenebis diisocyanate. "Adiprene" is a registered trademark of Uniroyal Corporation for polyurethane chemicals. "Desmodur" is a trademark of Mobay Corporation, for polyurethane chemicals. For the purpose of determining pot lives and forming plaques to determine physical properties of the cast polyurethane elastomers described below, the Adiprene ® L-100 prepolymer was used.

By subsequent experimentation, it was determined that high purity di(methylthio)-2,4-diaminotoluene can be best prepared by not driving the reaction to complete conversion. Also, it was discovered that the di(methylthio)-2,4-diaminotoluene may be isolated in greater than 95% purity as an orange oil by acid extraction with $H_3PO_4$. The crude is worked up with 1.5M NaOH and toluene; the aqueous layer discarded; and the toluene layer washed with 10% aqueous $H_3PO_4$. This product can then be flash distilled at 142°–152° C. and 0.25–0.35 mm Hg to afford a yellow oil more than 95% pure by vpc with a 97% recovery. The mono(methylthio)-2,4-diaminotoluenes can be distilled at 135°–147° C. and 0.37–0.45 mm Hg to afford a red oil.

EXAMPLE 8

Pot Life Testing

Some of the aromatic diamines of the invention were tested to determine pot life with a commercial prepolymer. Table I below reflects the pour times, pot lives, tack-free times, and firm times for polyurethane products made by admixing a preheated theoretical portion of the aromatic diamine with 25 grams of Adiprene ® L-100 prepolymer preheated to 80° C. or 100° C. in a polypropylene cup. The pot life is the time considered most pertinent to processors preparing polyurethane since the polyurethane reaction mixture can be handled fairly readily until expiration of the pot life. The pour times determined were the amount of time from mixing to the time when the reaction mixture in the polypropylene cup at 80° C. would not pour out of the cup. The pot life was determined by measuring the amount of time expired when the mixture in the cup would not flow under its own weight such as when the cup was rotated. The tack-free time was the amount of time measured from mixing the reactants to the time when the surface of the reaction mixture would not stick to an object. The firm time was the amount of time from mixture of reactants to the time when the reaction mass would offer substantial resistance to manual pressure.

The first values given in Table 1 below are for methylenebis (ortho-chloroaniline), MOCA, carried out in the same manner as for the aromatic diamines of the invention. Cast polyurethane elastomers were also prepared from Adiprene ® L-100 prepolymer and the aromatic diamine chain extenders of the invention by combining the theoretical amount of extender, given by Examples 1 and 4 with 125 grams of the prepolymer at 80° C. for 2 minutes. The mixture was degassed at 2 mm Hg for 2 minutes and then poured into castings or compression molds and cured for 2 hours at 100° C. All of the test pieces were aged at least one week at 24° C. and 50% relative humidity prior to testing.

A comparison of the processing times of Examples 1 and 2 discloses that the predominantly mono(alkylthio) composition of Example 2 is rapid in comparison to the predominantly di(alkylthio) composition.

TABLE I

| | PROCESSING TIMES IN MINUTES | | | | |
|---|---|---|---|---|---|
| Extender | Prepolymer Temp. (°C.) | Pour Time | Pot Life | Tack-Free | Firm |
| MOCA | 100 | | 15 | | |
| MOCA | 80 | | 20 | | |
| Example 1 | 100 | | 9 | | |
| Example 1 | 80 | 11.5 | 14.5 | 16 | 17 |

TABLE I-continued

| Extender | Prepolymer Temp. (°C.) | Pour Time | Pot Life | Tack-Free | Firm |
|---|---|---|---|---|---|
| Example 2 | 80 | 0.8 | 1.0 | 1.1 | 1.2 |
| Example 3 | 80 | 42 | 50 | 70 | 75 |
| Example 3 | 100 | 21 | 29 | 40 | 45 |
| Example 4 | 80 | 4.2 | 5.0 | 6.8 | 7.5 |
| DM-MPDA[1] MM-MPDA | 80 | 2.2 | 11.0 | 30 | 75 |
| DM-MPDA[2] TM-MPDA | 80 | 8.5 | 20.5 | 26 | 30 |
| MM-TDA[3] | 80 | 1.3 | 2.2 | 2.5 | 3.0 |

[1] A mixture of: 50% mono(methylthio)-meta-phenylenediamines; 46% di(methylthio)-meta-phenylenediamines.
[2] A mixture of: 50% di(methylthio)-meta-phenylenediamines; 49% 2,4,6-tri(methylthio)-meta-phenylenediamine.
[3] A mixture of: 51% 5-(methylthio)-2,4-diaminotoluene; 29% 3-(methylthio)-2,4-diaminotoluene; 16% 3,5-di(methylthio)-2,4-diaminotoluene; 5% 2,4-toluenediamine.

The physical properties of cast polyurethane elastomers prepared from Adiprene ® L-100 prepolymer chain extended with the di(methylthio)toluenediamine reaction products of Examples 1 and 4 were measured according to standard procedures. The results are given in Table 2.

TABLE II

PHYSICAL PROPERTIES DM-TDA[1] AND MOCA[2] (For Comparison)

| | EXAMPLE 1 | | | | | (MOCA)[2] | | |
|---|---|---|---|---|---|---|---|---|
| NH₂/—NCO, % | 85 | 86 | 94[3] | 95[3] | 105[3] | 85 | 95 | 105 |
| Hardness, Shore A | 90 | 89 | 85, 89 | 85, 86 | 88, 89 | | 90 | |
| Tensile Strength, psi | 2970 | 3530 | 2170, 3630 | 2960, — | 2670, 2760 | 4400 | 4500 | 3200 |
| Elastic Modulus, psi at 100% elongation | 1200 | 1170 | 880, 1100 | 870, — | 1040, 1110 | 1120 | 1060 | 1020 |
| Elastic Modulus, psi at 300% elongation | 2500 | 2520 | 1760, 1870 | 1450, — | 1550, 1570 | 2150 | 1820 | 1450 |
| Elongation at Break, % | 330 | 350 | 340, 450 | 520, — | 510, 530 | 420 | 480 | 530 |
| Tear Strength, lbs./inch | 50 | 62 | 75, 101 | 94, — | 112, 114 | 40 | 88 | 105 |
| Compression set, % | 31 | 32 | — | —, 46 | 58, 60 | 23 | 31 | 44 |
| Resilience, % | 45 | 45 | — | —, 45 | 45, 46 | — | 45 | — |

[1] 3,5-dimethylthio-2,4-diaminotoluene
[2] From Dupont Brochure AP-220.L100 (1976)
[3] 2 separate sample plaques

TABLE III

PHYSICAL PROPERTIES DM-TDA AND MOCA

| | EXAMPLE 4 | | | | | | (MOCA)[1] | | |
|---|---|---|---|---|---|---|---|---|---|
| NH₂/—NCO, % | 84.0 | 85.5 | 94.6 | 94.7 | 104.8 | 105.0 | 85 | 95 | 105 |
| Hardness, Durometer A | 87 | 85 | 86 | 86 | 86 | 86 | | | |
| Tensile Strength, psi | 2970 | 4290 | 3670 | 3100 | 3860 | 3050 | 4400 | 4500 | 3200 |
| Tensile Modulus at 100%, psi | 1310 | 1250 | 1190 | 1200 | 1200 | 1170 | 1120 | 1060 | 1020 |
| Tensile Modulus at 300%, psi | — | 2580 | 1930 | 1980 | 1750 | 1630 | 2150 | 1820 | 1450 |
| Elongation at Break, % | 270 | 365 | 445 | 400 | 495 | 525 | 420 | 480 | 530 |
| Tear Strength, lbs./inch | 38 | 60 | 105 | 107 | 130 | 124 | 40 | 88 | 105 |
| Compression set, % | 21 | 27 | 42 | 36 | 42 | 52 | 23 | 31 | 44 |
| Resilience, % | 45 | 44 | 43 | 44 | 44 | 44 | — | 45 | — |

[1] From Dupont Brochure AP-220.L100 (1976)

Although the invention has been described in detail in the foregoing for the purpose of illustration, it is to be understood that such detail is solely for that purpose and that variations can be made by the skilled artisan without departing from the scope or spirit of the invention as set forth in the claims.

We claim:

1. A polyurethane product formed by reacting a polyisocyanate; an organic active hydrogen group-containing compound; and a chain extender comprising an aromatic diamine having at least one aromatic ring, one of said at least one aromatic ring having thereon at least two alkylthio substituents and at least one amino substituent.

2. A polyurethane of claim 1 wherein said diamine has two or three alkylthio substituents on said aromatic ring of said diamine.

3. A polyurethane of claim 2 wherein said aromatic diamine is a substituted or unsubstituted di(alkylthio)-diaminobenzene.

4. A polyurethane of claim 3 wherein said aromatic diamine is a substituted or unsubstituted di(methylthio)-diaminobenzene.

5. A polyurethane of claim 4 wherein said aromatic diamine is an alkyl-substituted di(methylthio)diaminobenzene.

6. A polyurethane of claim 5 wherein said aromatic diamine is 3,5-di(methylthio)-2,4-diaminotoluene.

7. A polyurethane of claim 5 wherein said aromatic diamine is 3,5-di(methylthio)-2,6-diaminotoluene.

8. A polyurethane of claim 2 wherein said aromatic diamine comprises a mixture of 3,5-di(methylthio)-2,4-diaminotoluene and 3,5-di(methylthio)-2,6-diaminotoluene.

9. A polyurethane of claim 8 wherein the ratio of said mixture is about four parts 3,5-di(methylthio)-2,4- diaminotoluene to one part 3,5-di(methylthio)-2,6-diaminotoluene.

10. A polyurethane of claim 2 wherein said aromatic diamine is 2,4,6-tri(methylthio)-meta-phenylenediamine.

11. A polyurethane of claim 2 wherein said aromatic diamine is 3,5-di(ethylthio)-2,4-diaminotoluene.

12. A polyurethane of claim 1 wherein said chain extender is predominantly an aromatic diamine having exactly two alkylthio substituents on said aromatic ring of said diamine.

13. A polyurethane of claim 1 wherein said aromatic diamine is an alkylenebis(aminobenzene) having exactly two alkylthio substituents on at least one aminobenzene ring.

14. A polyurethane of claim 13 wherein said aromatic diamine is a methylenebis(aminobenzene) having two alkylthio substituents on at least one aminobenzene ring.

15. A process for preparing polyurethane cast elastomers comprising the steps of:
 (A) casting into a mold a reaction mixture of an isocyanate prepolymer and a chain extender comprising an aromatic diamine having at least one aromatic ring, one of said at least one aromatic ring having thereon at least two alkylthio substituents and at least one amino substituent;
 (B) curing said reaction mixture in said mold to form a polyurethane product; and
 (C) subsequently removing said polyurethane product from said mold.

16. The process of claim 15 carried out at a temperature of about 25° C. to 150° C. and wherein the amount of said chain extender is from about 5 to 30 weight percent of said reaction mixture.

17. The process of claim 15 wherein said chain extender is predominantly an aromatic diamine having an aromatic ring, said ring having thereon at least one amino substituent and at least two alkylthio substituents.

18. The process of claim 15 wherein said chain extender is predominantly a substituted or unsubstituted dialkylthio diaminobenzene.

19. The process of claim 18 wherein said chain extender is predominantly 3,5-di(alkylthio)-2,4-diaminotoluene.

20. The process of claim 19 wherein said chain extender is predominantly 3,5-di(methylthio)-2,4-diaminotoluene.

21. The process of claim 18 wherein said chain extender comprises a mixture of 3,5-di(methylthio)-2,4-diaminotoluene and 3,5-di(methylthio)-2,6-diaminotoluene.

22. The process of claim 21 wherein the ratio of said mixture is about four parts 3,5-di(methylthio)-2,4-diaminotoluene to one part 3,5-di(methylthio)-2,6-diaminotoluene.

23. The process of claim 15 wherein said aromatic diamine is an alkylenebis(aminobenzene) having two alkylthio substituents on at least one aminobenzene ring.

24. A polyurethane prepared by reacting
 (A) one equivalent part of a prepolymer containing 0.5 to 15.0 weight percent free —NCO groups prepared by reacting an organic polyisocyanate with an organic active hydrogen group-containing compound with
 (B) 0.8 to 1.2 equivalent parts of chain extender having as its main component an aromatic diamine having at least one aromatic ring, one of said at least one aromatic ring having thereon at least two alkylthio substituents and at least one amino substituent.

25. A polyurethane of claim 24 wherein said diamine is a substituted or unsubstituted di(alkylthio)diaminobenzene.

26. A polyurethane of claim 25 wherein said aromatic diamine is a substituted or unsubstituted di(methylthio)-diaminobenzene.

27. A polyurethane of claim 26 wherein said aromatic diamine is 3,5-di(methylthio)-2,4-diaminotoluene.

28. A polyurethane of claim 24 wherein said chain extender comprises a mixture of 3,5-di(methylthio)-2,4-diaminotoluene and 3,5-di(methylthio)-2,6-diaminotoluene.

29. A polyurethane of claim 28 wherein the ratio of said mixture is about four parts 3,5-di(methylthio)-2,4-diaminotoluene to one part 3,5-di(methylthio)-2,6-diaminotoluene.

30. The process of claim 15 wherein said reaction mixture is prepared by adding said chain extender to an isocyanate prepolymer at about 50°–150° C.

* * * * *

UNITED STATES PATENT AND TRADEMARK OFFICE
CERTIFICATE OF CORRECTION

PATENT NO.  : 4,595,742
DATED       : JUNE 17, 1986
INVENTOR(S) : CHRISTOPHER J. NALEPA, ET AL.

It is certified that error appears in the above-identified patent and that said Letters Patent is hereby corrected as shown below:

Column 1, line 61, reads "isomers is used" and should read -- isomers are used --.

Column 1, line 63, reads "also within the scope of the invention" and should read -- also within the invention --.

Column 2, line 9, reads "structure wherein at least" and should read -- structure such that at least --.

In the Abstract, line 2, reads "having an aromatic ring" and should read -- having at least one aromatic ring --.

Signed and Sealed this

Fourteenth Day of October, 1986

[SEAL]

Attest:

DONALD J. QUIGG

*Attesting Officer*  *Commissioner of Patents and Trademarks*